United States Patent [19]

Cupuis et al.

[11] 4,402,074
[45] Aug. 30, 1983

[54] SWITCHING NETWORK TEST SYSTEM

[75] Inventors: Bernard Cupuis, Maurepas; Jacques Thiaud, Versailles, both of France

[73] Assignee: Compagnie Industrielle des Telcommunications Cit-Alcatel, Paris, France

[21] Appl. No.: 196,978

[22] Filed: Oct. 14, 1980

[30] Foreign Application Priority Data

Oct. 12, 1979 [FR] France ............... 79 25475

[51] Int. Cl.³ .................. H04J 3/00; H04Q 11/04
[52] U.S. Cl. .................. 370/14; 179/175.2 R
[58] Field of Search ............ 370/14, 54, 63; 179/175.2 R, 175.2 D

[56] References Cited

U.S. PATENT DOCUMENTS

| | | | |
|---|---|---|---|
| 3,909,562 | 9/1975 | Lager | 370/14 |
| 4,064,369 | 12/1977 | Battocletti | 370/14 |
| 4,254,498 | 3/1981 | Tawara et al. | 370/63 |
| 4,302,836 | 11/1981 | d'Ivoire et al. | 370/14 |
| 4,355,386 | 10/1982 | Binz et al. | 370/13 |

*Primary Examiner*—Gerald L. Brigance
*Attorney, Agent, or Firm*—Sughrue, Mion, Zinn, Macpeak and Seas

[57] ABSTRACT

A test system for a stored program controlled time-division switching network subdivided into subsystems. The test system includes circuits for selecting, injecting and retrieving data samples and testing for the correct setting of switchpaths through the switching network. A stored program control unit receives test instructions and transmits in response thereto reporting messages including retrieved data samples. A selection control circuit interconnects the subsystems to which a test instruction relates. The subsystems are provided with an interchange circuit for receiving and storing samples, a sample injection and retrieval circuit, and a circuit for synchronizing the receiving and storing circuit with time slot information identifying a sample which has been received and the sending circuit with the time slot into which a sample is injected.

9 Claims, 6 Drawing Figures

SWITCHING NETWORK TEST SYSTEM

The invention concerns a test system for the switching network of a switching centre, and particularly a program-controlled switching network comprising at least one time-division switching stage. The invention is applicable in particular to the telecommunications industry.

BACKGROUND OF THE INVENTION

There already exist systems for testing for the correct setting up of switchpaths through a switching network. In the case of time-division switching networks, one method involves verifying correct transmission of digital samples through the stages of the network. This known method provides two types of test:

passive test: samples are taken from the network input and the output corresponding to the switchpath to be tested, and are then compared;

active test: a sample is injected at the input and retrieved from the output for comparison.

Known systems of this type have disadvantages. The system for selecting the test points is sometimes that used to control the switching network under normal circumstances, in which case the units under test must be isolated from traffic. In other cases an independent system is provided, resulting in a significant increase in complexity.

In the case of a time-division switching network, the known test systems operate synchronously with the switching network control units. They are necessarily located after units for synchronising the incoming time-division multiplex links. Thus these synchronisation units are not tested for correct operation.

The invention is intended to provide a test system which simplifies selection of test points according to their geographical location, the stage of the network and the required test mode, providing for executing tests ahead of the synchronising units and offering great flexibility in terms of the interchange of messages with the control units of the switching centre.

SUMMARY OF THE INVENTION

The invention consists in a test system for a stored program-controlled time-division switching network subdivided into subsystems comprising means for selecting, injecting and retrieving data samples to test for the correct setting up of switchpaths through the switching network, characterised in that it comprises means for communicating with the stored program control unit to receive test instructions and to send report messages including retrieved data sample(s), selection control means addressing the subsystems to which a test instruction relates and controlling said sample selection, injection and retrieval means, and interchange means comprising a circuit for receiving and storing samples, a sample injection and retrieval circuit and a circuit for synchronising the receiving circuit with the time slot from which a sample is retrieved and the sending circuit with the time slot into which a sample is injected.

BRIEF DESCRIPTION OF THE DRAWINGS

One embodiment of the invention will now be described by way of example and with reference to the accompanying drawings.

DETAILED DESCRIPTION

The following description relates to a telephone switching centre with centrally controlled time-division switching network.

The switching network is of the TSSST type, comprising input time switches, followed by three space switching stages and an output time switch stage.

Figure 1:
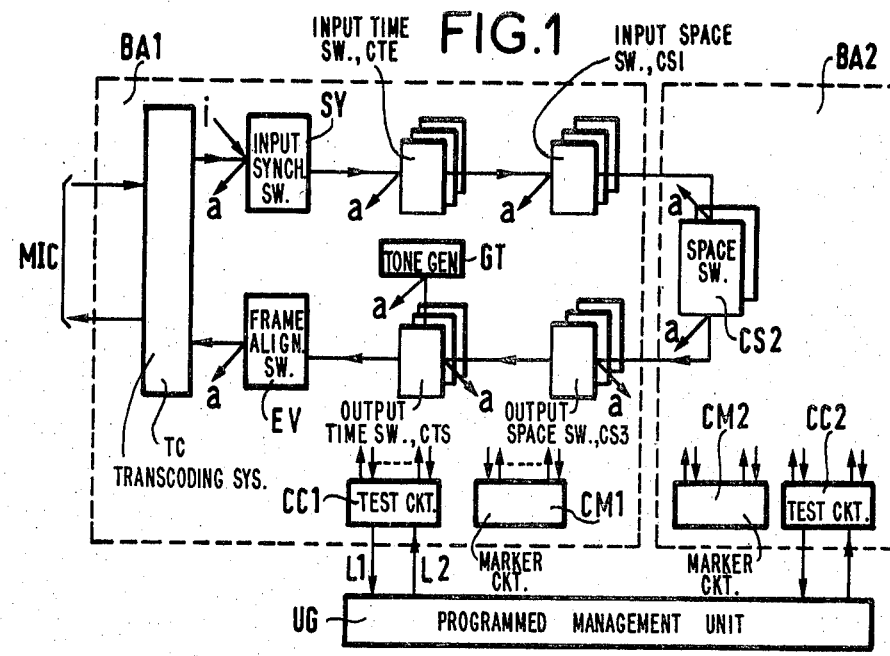
FIG. 1 shows a typical switching network to which the invention applies.

In the system to be described, a test system in accordance with the invention is provided for each rack of the switching network. FIG. 1 shows two types of rack: BA1 and BA2. Racks BA1 contain the circuits interfacing with the incoming and outgoing multiplex pulse-code modulation (PCM) links, the time switch stages and two space switching stages. Rack BA2 houses the central space switching stage.

The digital multiplex links may be, for example, PCM links to European standards comprising $32 \times 8$-bit channels sampled at a frequency of 8 kHz. The interface between the PCM links and the switching network comprises a transcoding system TC which converts the HDB3 code used on the PCM links into binary code on the input side and the complementary conversion on the output side, an input synchronisation circuit SY which synchronises the data received on the incoming PCM links with the local clock, and a frame alignment signal output circuit EV which sends from the output of the switching network the frame alignment signals which synchronise the outgoing PCM links. Tones are sent from an output time switch CTS by a tone generator GT.

The present application of the invention provides the following test facilities:

at the input of synchronising circuit SY: it is possible to analyse a sample (8 bits) of any time slot or to substitute a known test code for any such sample;

analysis of a sample on any speech path at various points in the switching network: input of input time switch CTE, input of space switch CS1, input and output of space switch CS2, input of space switch CS3, input of output time switch CTS, output of tone generator GT, output of frame alignment signal output circuit EV. In FIG. 1 these points are designated by arrows marked a and the point at which the known test code is injected is designated by an arrow marked i.

Test circuits CC1, CC2 of the various racks BA1, BA2 are controlled by a programmed management unit UG. The telephone switching centre is controlled by two central processors. Commands from these processors are relayed by management units UG. The management units UG are assigned to controlling the switching network through the intermediary of a marker peripheral.

In the present application, management unit UG controls each rack of the switching network through the intermediary of two circuits (FIG. 1):

a marker circuit CM1, CM2 which transmits to the switching network connection commands from the central processors (this function does not constitute a part of the invention); and a test circuit CC1, CC2, each test circuit being connected to management unit UG by two serial links L1, L2 each providing one-way transmission of messages.

Figure 2:
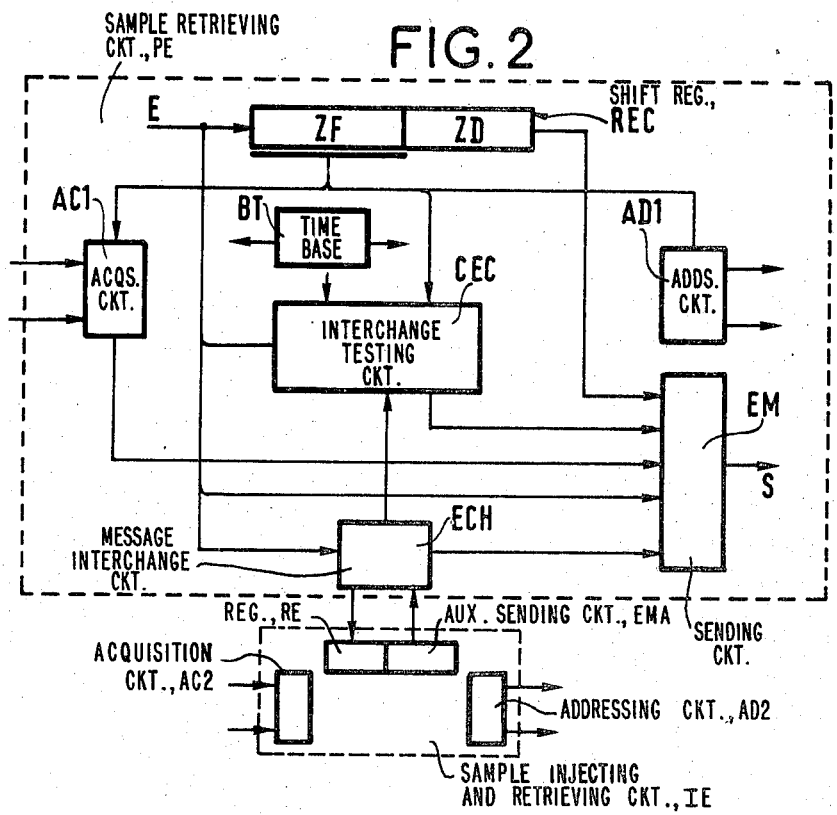
FIG. 2 is a block schematic of a test system in accordance with the invention.

The embodiment of the test system shown in FIG. 2 comprises a circuit PE for retrieving samples utilised in racks BA1 and BA2 and a circuit IE for injecting and retrieving samples used in rack BA1, at the input to synchronising circuit SY.

Referring to FIG. 2, sample retrieval circuit PE comprises:

a shift register REC whose input E is connected to the serial link from management unit UG; as will be explained later, a message from management unit UG comprises one part (field ZD) assigned to the analysis or injection of a speech path sample at the input of the switching network and another path (field ZF) assigned to selecting the point within the network from which this sample is retrieved;

an addressing circuit AD1 used to select the analysis point;

an acquisition circuit AC1 used to retrieve the sample to be analysed from various points within the switching network;

a circuit CEC for testing interchanges with management unit UG, controlled by a timebase BT;

a circuit ECH providing for interchange of messages with the sample injection and retrieval circuit IE at the input to the time-division switching network; and a sending circuit EM connected to the serial link S to the management unit.

Figure 4:
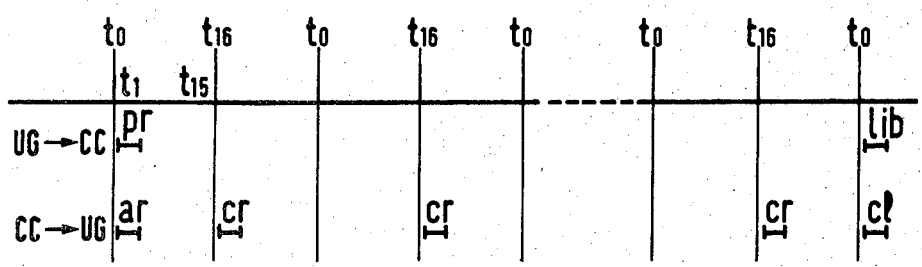
FIG. 4 is a diagram representing the interchange of messages between a management unit and the test system

As will be explained later, sending circuit EM is connected to input E of the sample retrieval circuit, to the output of register REC and to the outputs of circuits AC1, CED and ECH. These connections provide for the message interchange procedure represented schematically in FIG. 4. The switching network is controlled by a local clock which generates time slots t0 to t31 for the respective speech paths of the multiplex links. To send a message, the management unit sends a seizure signal pr at the start of a frame (t0). The destination circuit CC sends an acknowledgement ar. In the middle of each frame (t16), circuit CC sends the management unit a report cr on the data analysed. When management unit UG decides that sufficient data has been received, it sends at time t0 following the last report (t16) a clearing signal lib. Circuit CC responds with a clearing report cl. Signal ar is obtained by directly looping the seizure message to the management unit. Signal cl consists of the contents of register REC which is sent by circuit EM on receipt of signal lib. Report message cr enables transmission of the samples received by circuit AC1 or circuit IE, under the control of circuit CEC.

The input sample injection and retrieval circuits IE comprise a register RE and an auxiliary sending circuit EMA for interchanging messages with the analysis circuit, an addressing circuit AD2 and an acquisition circuit AC2 for injecting or retrieving samples at the switching network input.

Figure 3:
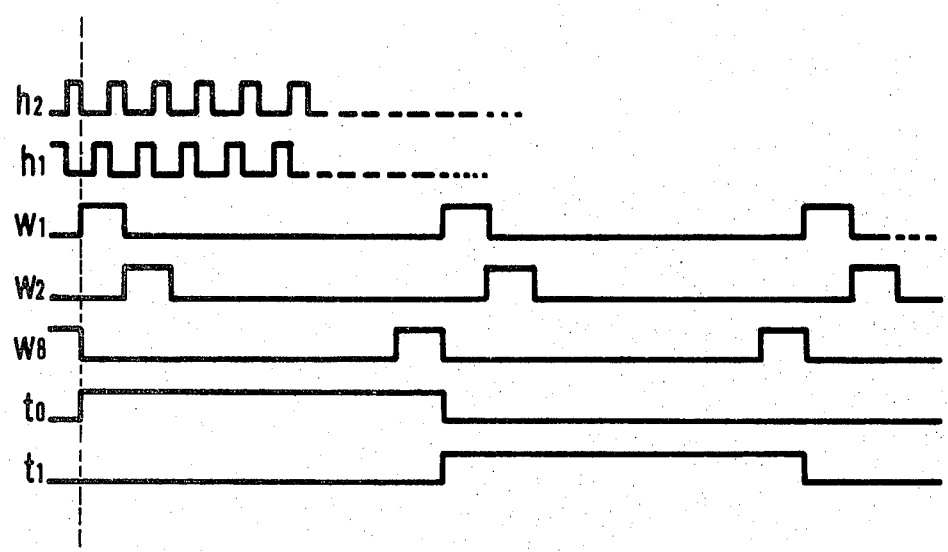
FIG. 3 is a diagram showing the principal clock signals controlling operation of the test system.

Examples of the sample retrieval and sample injection circuits will be described in more detail with reference to FIGS. 5 and 6, respectively. These circuits utilise the signals generated by the local timebase BT and shown in FIG. 3. Signals ti represent the time slots of the multiplex links. Signals w1 to w8 correspond to the eight bits of each time slot. Each of signals wi is divided into three phases: h0 (not used), h1 and h2.

Each of fields ZF and ZD of register REC holds a function code F specifying the sector of the switching network involved (arrows a and i, FIG. 1), the type of test (active or passive) in the case of field ZD, and a path address code V comprising the address of the path under test and the number of the time slot.

Figure 5:
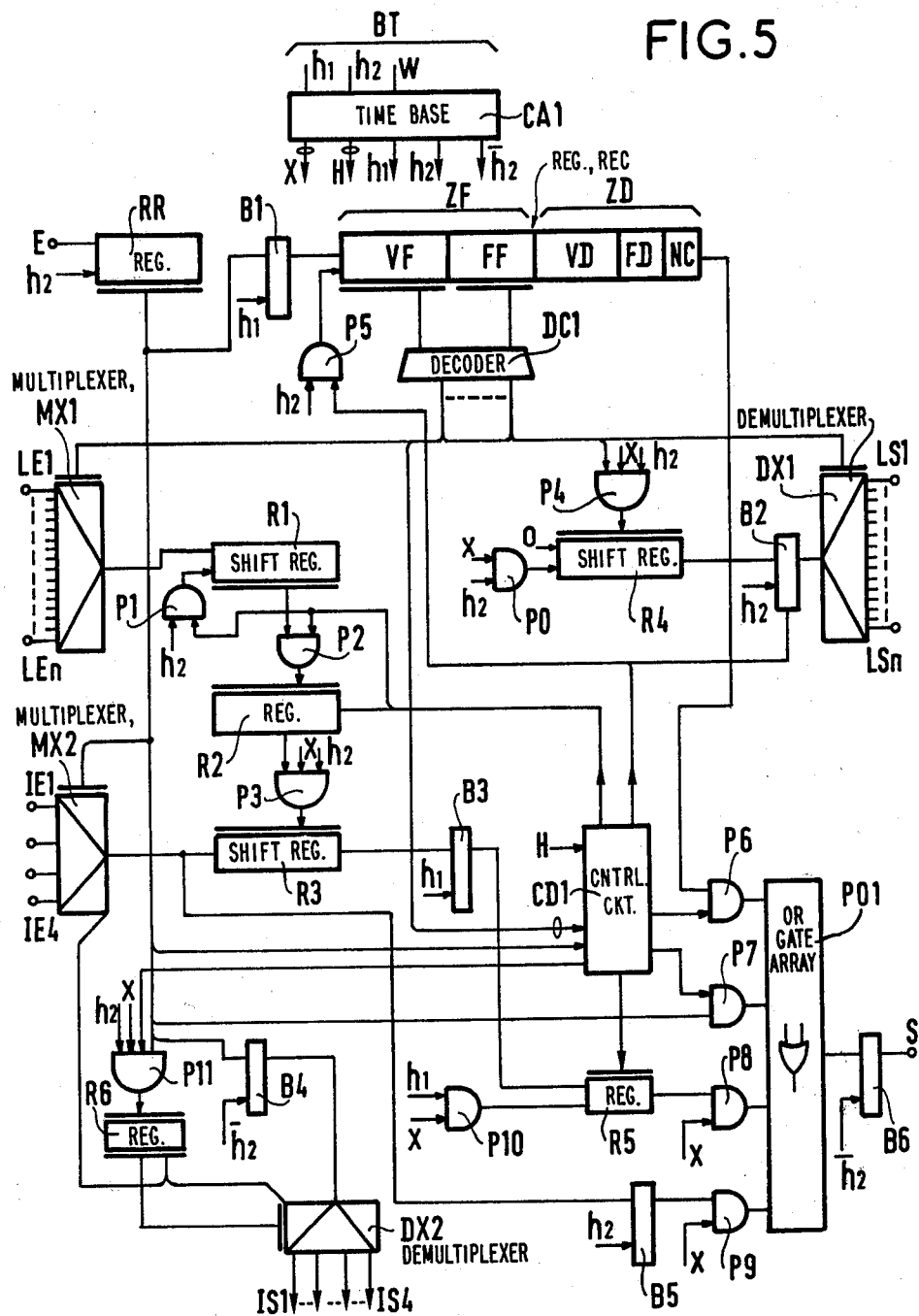
FIG. 5 is a more detailed block schematic of a sampling circuit shown in FIG. 2.

Referring to FIG. 5, input E is connected to the serial data input of a three-stage shift register RR, the clock input of which is enabled by signal h2. The input message passes through this register to register REC, through a type D bistable B1 controlled by signal h1, and to interchange circuit ECH (FIG. 2). Parts VF and FF of field ZF are connected to a decoder DC1. The first three bits of the message loaded into register RR belong in field ZD and comprise a code NC indicating the number of the time switch to which the test relates and the first bit of code FD indicating whether sample injection and retrieval circuit IE is to operate or not. This provides for routing field ZD directly to the sample injection and retrieval circuit IE.

Figure 6:
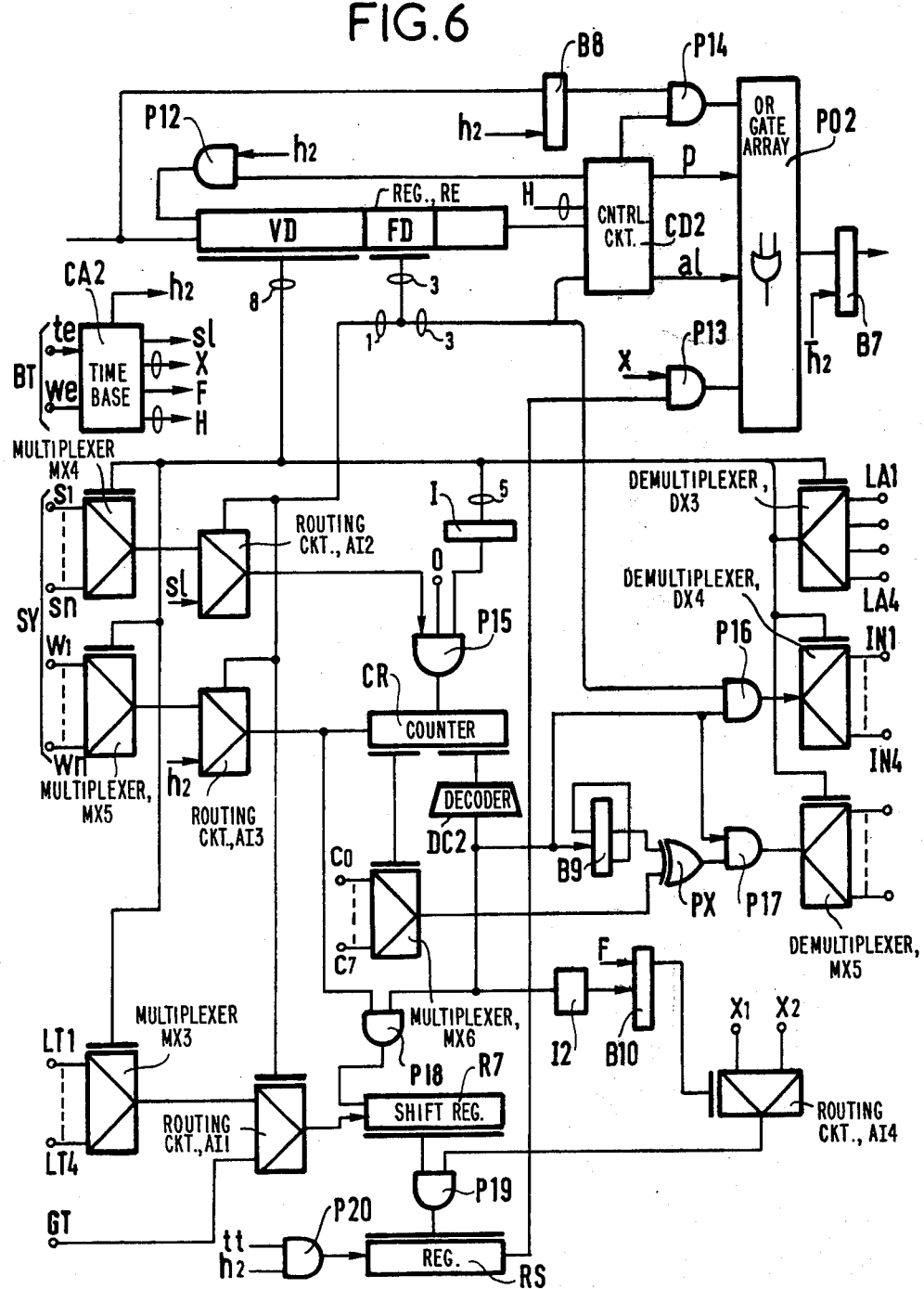
FIG. 6 is the block schematic of a time slot injection and retrieval circuit shown in FIG. 2.

Before describing the circuits shown in FIGS. 5 and 6 in more detail, it would be as well to discuss how the test points are selected and the clock signals utilised.

For security reasons, the racks are subdivided into modules, there being a link in each direction between each module and the test system. The selection circuits AC and AD of FIGS. 5 and 6 include multiplexers and demultiplexers providing access to these links. The path to be tested is selected by sending an address through these demultiplexers. The time slot is selected at the level of the system itself, which is synchronised with the time slot under test. In the case of sample retrieval circuit PE synchronisation is obtained by means of the local timebase. In the case of circuit IE it is obtained by recovering the distant end clock in the synchronising circuit SY of the input time switch stage, using a known method. Interchanges of data within the test system are carried out at the same rate as data is conveyed on the PCM links, that is to say at a frequency of 2.040 MHz. Signals h1 and h2 are used for this purpose. The various interchanges between parts of the system are enabled during time intervals defined at the level of the sample retrieving circuit and circuit IE by timing circuits CA1, CA2 connected to timebase BT. The interchange test circuit CEC shown in FIG. 2 comprises timing circuit CA1 and a control circuit CD1. Timing circuit CA1 sends signals H to circuit CD1 and signals X to the other parts of the system. These latter signals will not be described in detail as this would not be relevant to the understanding of the invention. They are formed as simple logical combinations of signals ti, wi, hi. Control circuit CD1 controls the various phases of test processing and interchanges of messages with the management unit. It receives data from circuit CA1, at the output of decoder DC1, and at the output of register RR. Control circuit CD1 includes bistables for storing the various processing and message interchange phases (processing of fields ZD and ZF, seizure, acknowledgement and clearing phases). Circuits CA1 and CD1 will not be described in detail, as their design will be readily apparent from the information already provided and from the description of system operation to be given below.

Circuit AC1 (FIG. 5) comprises a multiplexer MX1 connected to lines LE1 to LEn from the modules. It is connected to the input of a shift register R1 controlled by signal h2 through an AND gate P1. The parallel output of register R1 is connected to the input of a register R2 through AND gate P2. Gates P1 and P2 are enabled by circuit CD1. Sending circuit EM comprises a shift register R3 whose parallel input is connected to the output of register R2 through an AND gate P3 enabled by signal h2 and signal X. Circuit AD1 comprises a demultiplexer DX1 whose outputs are connected to select lines LS1 to LSn by the modules. The data for addressing paths in the modules are stored in a shift register R4 of circuit AD1, receiving on its clock inputs signals X and h2 through an AND gate P0, its data input being held at 0. The output of this register is connected to the input of demultiplexer DX1 by a bistable B2 controlled by signal h2 and enabled by the output of circuit CD1. The outputs of decoder DC1 are connected to the addressing inputs of circuits MX1 and DX1 and to a group of AND gates P4 connected to the parallel input of register R4. Gates P4 are enabled by signals X and h2. The clock input of register REC is controlled by signal h2, through a gate P5 enabled by the output of circuit CD1.

Sending circuit EM comprises an OR gate circuit PO1 which passes the various signals to the management unit through AND gates controlled by circuits CA1, CD1: gate P6 is connected to the output of register REC and controlled by circuit CD1 to send the release report, gate P7 is connected to the output of register RR and controlled by circuit CD1 to send the seizure acknowledgement, gate P8 sends the data to be checked and is enabled by circuit CA1, and gate P9 sends the acknowledgement from circuit IE and is enabled by circuit CA1.

The data to be checked is stored in register R3. The output of this register is connected to gate P8 through a bistable B3 controlled by signal h1 and a shift register R5. Register R5 receives signal h1 on its clock input through gate P10 enabled by circuit CA1. The parallel input of register R5 is connected to circuit CD1.

The interface ECH with the sample injection and retreival circuit IE provides for retrieving the sample from the time slot under test at the input to the network or at the output to the tone generator.

In the embodiment described, a rack BA1 comprises four time switches, to each of which is assigned a circuit IE. The links between sample retrieval circuit PE and circuits IE are provided by a multiplexer MX2 with four inputs IE1 to IE4 from the four IE circuits and a demultiplexer DX2 with four outputs IS1 to IS4 to the four IE circuits. Circuits MX2 and DX2 are addressed by means of a switch number NC and are enabled by the first bit received of code FD. This bit is transmitted from the output of register RR to circuits MX2 and DX2 through a register R6 and a gate P11 enabled by signal h2 and by circuits CA1 and CD1. Field ZD of the message is sent to register RE of the sample injection and retreival circuit IE (FIGS. 2 and 6) through register RR, a bistable B4 controlled by the falling edge of signal h2 and demultiplexer DX2.

The output of circuit MX2 is connected to the input of register R3 and to gate P9 through a bistable B5 controlled by signal h2.

Gates PO1 are connected to output S to the management unit through a bistable B6 controlled by the falling edge of signal h2.

Referring to FIG. 6, the general structure of circuit IE is similar to that of sample retrieval circuits PE. Input EA is connected to interchange register RE. Circuits CA2 and CD2 provide functions analogous to those of circuits CA1 and CD1 of the sample retrieval circuit. Register RE is controlled by signal h2 by circuit CD2 through a gate P12. Sending circuit EMA of FIG. 2 comprises an output register RS, the output of which is connected through an AND gate P13 enabled by circuit CA2 to the input of a group of OR gates PO2 providing a function analogous to that of gates PO1. The output of gates PO2 is connected to the output S1 to the sample retrieval circuit PE through a bistable B7 enabled simultaneously with bistable B6. The acknowledgement is sent by re-injecting the seizure signal received on input EA through a bistable BA enabled by signal h2 and a gate P14 controlled by circuit CD2 and connected to gates PO2. A seizure signal pr and a clearing acknowledgement al are sent directly from circuit CD2 to gates PO2. Access circuit AC2 comprises a multiplexer MX3 connected to a shift register R7 through a routing circuit AI1 (a two-input multiplexer). In the installation described, a time switch is connected to 16 PCM links organised into four modules, and a tone generator GT. A link from the four modules is connected to the input of multiplexer MX3 addressed by two bits of word VD. Routing circuit AI1 provides access to register R7, from the multiplexer or from the tone generator GT, and is addressed by one bit of word FD. At the output to the time switch modules addressing AD2 comprises three demultiplexers DX3, DX4, DX5. Demultiplexer DX3 is a dual demultiplexer which sends to modules LA1 to LA4 over two-wire links two bits of word VD for selecting one of the four PCM links assigned to the module. Demultiplexer DX4 has four outputs IN1 to IN4 used to send to the addressed module a command to inject a test code. Demultiplexer DX5 sends the test code serially to the selected module. Circuits MX3 and DX3 to DX5 are addressed by the two bits of word VD used to select the module.

The remainder of this description relates to the means for analysing or injecting a sample on a time slot in phase with the incoming PCM link and transmitting a received sample to the analysis circuits in phase with the local timebase. Using a known method, synchronising circuit SY recovers for each of the incoming PCM links the sampling signal w and a frame synchronising signal s. For further details refer, for example, to an article in the French review "Commutation et Electronique", No 34, July 1971, pages 11 to 14. These signals are recovered in each module by multiplexers MX4 and MX5 addressed simultaneously with multiplexer MX3. Routing circuits AI2 and AI3 addressed simultaneously with routing circuit AI1 receive these signals or the corresponding signals from the local timebase, according to whether the test is to be effected at the input switching stages or at the tone generator.

The system is synchronised with the time slot under test by means of an 8-bit counter CR, the five most significant bits of which address the time slot under test, the three least significant bits addressing each bit of this time slot sequentially. This operation involves loading the counter with the 32's complement of the number of the time slot under test on the frame synchronisation signal. This means that the counter will go to 0 when the time slot under test comes up. A group of AND gates P15 enabled by the output of routing circuit AI2 receives the time slot number from words VD through a group of switches I (5 bits+3 least significant bits at 0). The code to inject is set up on inputs c0 to c7 of a multiplexer MX6 addressed by the least significant bits of counter CR. Passage through 0 of this content is detected by a decoder DC2, the output of which sends a signal through a gate P16 to the input of multiplexer DX4 and to the enabled input of a gate P17 providing access to demultiplexer DX5. Gate P16 is enabled by a bit in word FD indicating an active test, that is to say one with injection of a sample. To increase the efficiency of the active test, the code c0–c7 and the complementary code are sent alternately. To this end, the output of multiplexer MX6 is connected to the input of gate P17 by an exclusive-OR gate PX. The second input of gate PX is connected to the output of decoder DC2 through a bistable B9 operating as a counter.

The sample received on incoming lines LT1 to LT4 or GT is loaded into register R7 at the rate set by signals w or h2, received through a gate P18 enabled by the output of decoder DC2. Data is transferred from register R7 to register RS of the sending circuit by means of a gate P19 which is enabled by a circuit which avoids interference between the loading the register R7, timed by the clock of the incoming PCM link, and the loading of register RS under the control of the local clock, which is not synchronised with the clock of the incoming PCM link. This circuit comprises a bistable B10, the clock input of which is connected to the output of decoder DC2 through an inverter I2 and the data input of which is enabled by a timing signal F from circuit CA2, and a routing circuit AI4 addressed by the output of bistable B10 to pass either of the clock signals X1, X2 output by circuit CA2, the output of this routing circuit enabling gate P19.

Signal X1 is in the middle of timing signal F. Signal X2 is outside signal F. Thus after the time slot under test comes up, when the output of decoder DC2 goes to 0, if outside timing signal F the transfer occurs on X1 and if inside signal F transfer occurs on X2.

The duration of timing signal F is such that the management unit can request the testing of a very large number of successive frames by means of a single message, even where there is a substantial deviation between the distant end and local clocks.

The transfer of the sample from register RS to register R3 of the sample retrieving circuit is controlled according to a timing signal tt from control circuit CD2 and later than signals X1 and X2, at a rate set by signal h2 obtained through a gate P20.

Operation

Interchanges of data between the system and the management unit are synchronised with the local clock. Operation is the same whether the start and end operations are in the same or different racks. Where the racks are different, the management unit sends a message to the test system of each rack, each system using only one of fields ZD and ZF of the message.

Seizure message: the management unit sends the message to be processed directly to input E, field NC first. On the simultaneous filling of registers RR and R6, circuits MX2 and DX2 are enabled and the serial data is entered simultaneously into registers RE and REC at a rate set by signals h2. At the same time, the message is looped to the management unit: first field ZD (in bistables B8 and B7, multiplexer MX2, bistables B5 and B6) then field ZF (gate P7 and bistable B6).

When field ZD has been loaded into register RE, circuit CD2 disables gate P14 and sends a recognition signal pt to the analysis circuit. At the same time circuit CD2 disables the input of register RE through gate P12 and the access and addressing circuits are set.

On the occurence of the frame synchronising signal (s1 to sn or sl) counter CR is loaded with the complement of the time slot number. The start of chain active or passive test is executed as described above.

In the same manner and at the end of reception of field ZF, in the sample retrieving circuit gate P5 providing access to register REC is disabled by circuit CD1. Parts VF and FF are decoded to set circuits MX1 and DX1 and load register R4. There are no resynchronisation difficulties as the sample to be tested is recovered from register R1 and transferred into register R2 according to local timing signals. However, the loading of these registers is enabled by circuit CD1, and so must allow for the point within the switching network at which the test is executed, because of the transfer and processing times within the switching network. Thus circuit CD1 generates signals for successively enabling gates P1 and P2, from the signals from timebase BT and the code FF in field ZF which indicates the stage of the switching network at which the test is to be executed. There is no need to describe the generation of the signals in more detail.

Report: the report message sent on each timing pulse t16 (FIG. 4) comprises the following elements, sent serially:

a recognition code loaded by circuit CD1 into register R5, indicating that the report message comprises or does not comprise the samples retrieved at the start and end of the chain (the elements required by circuit CD1 to generate this code are code FF and the signal pr transmitted by the sample injection and retrieval circuit);

the sample tested at the end of the chain: this sample is contained in register R3 and transmitted through bistable B3, register R5 and gate P8; and the sample retrieved at the start of the chain: this sample is contained in register RS and is transferred into register R3 when the sample retrieved at the end of the chain has been sent.

Clearing report cl: the clearing signal lib sent by the management unit is transmitted from input E of the system to circuit CD1. It is also sent to circuit CD2 through demultiplexer DX2 and bistable B8. Circuits CD1 and CD2 respond to this signal by enabling gates P5 and P12 providing access to registers REC and RE and by authorising access to links c1, ac, al. From this time on registers REC and RE are shifted simultaneously at a rate set by signals h2, by virtue of a blank field which means that the register RE has the same capacity as register REC. The initial message is returned to the management unit: first field ZD (link al, multiplexer MX2, bistable B5 and gate P9 enabled by signal X for the time needed to empty register RE), then field ZF (by gate P6 enabled by circuit CD1 as soon as gate P9 is enabled).

This arrangement enables the management unit to test for correct reception of the message by the sample retrieval circuit PE and the sample injection circuit IE. It will be understood that the scope of the invention will not be exceeded by the use of technical means equivalent to those described by way of example hereinabove. In particular, the addressing, selection, recording and counting circuits may be replaced by equivalent means.

We claim:

1. In a test system for a time-division switching network, said time division switching network being subdivided into subsystems, in an exchange controlled by central computers through a plurality of programmed management units relaying commands between said subsystems and said computers, said test system having means for retrieving samples from a plurality of predetermined test points in said switching network and for injecting samples at inputs of said network, said retrieving means and said injecting means being controlled by said central computers through said programmed management units, the improvement comprising, in said means for injecting and retrieving:

means for interchanging messages with a predetermined one of said management units through input and output serial links;

selection control means for controlling sample retrieval and injection in said subsystems according to messages received by said means for interchanging messages; and synchronizing means for synchronizing said injecting and retrieving means for synchronizing injection and retrieval of samples and for sending messages to said management unit via said message interchanging means.

2. The test system according to claim 1, wherein said switching network is of a type having input time switches and a distant end clock recovery and input synchronization circuit upstream of said input time switches, and wherein the improvement further comprises, in said synchronizing means, a counter receiving a distant end clock and a time slot number contained in a message received from said predetermined one of said management units for generating a command effecting at least one of injection and retrieval of a sample ahead of said recovery and input synchronization circuit in a predetermined time slot.

3. The test system according to claim 1, wherein the improvement further comprises, in said means for interchanging messages:

a shift register coupled to receive messages from said predetermined one of said management units through said input serial link;

a time base for generating timing signals;

a circuit for testing message interchanges under control of said time base; and a message sending circuit connected to said output serial link for sending messages towards said predetermined one of said management units.

4. The test system according to claim 3, wherein the improvement further comprises, in said means for interchanging messages, a message sending circuit for responding to a message received from said predetermined one of said units by sending at least one response message comprising a repeat of the received message.

5. The test system according to claim 4, wherein the improvement further comprises, in said selection control means, a multiplexer receiving on inputs thereof a test sample to be injected, said multiplexer being addressed by predetermined least significant bits of said counter; and demultiplexers for sending to said switching network a sample injection command produced on an output of said counter and said test sample to be injected.

6. The test system according to claim 5, wherein the improvement further comprises, in said selection control means, an exclusive OR gate (PX), said multiplexer sending said test sample through said exclusive-OR gate to said predetermined one of said management units, said exclusive-OR gate having one input connected to an output of said counter through a two-state binary counter so that said test sample is complemented on each injection command.

7. The test system according to claim 6, wherein the improvement further comprises, in said selection control means, a multiplexer for providing access to said plural subsystems of said switching network; and a storage register for receiving and storing retrieved samples.

8. The test system according to claim 7, wherein the improvement further comprises, in said selection control means, a register for storing retrieved samples; a timing circuit; and an enabling circuit for enabling said register, said enabling circuit being controlled by an output of said timing circuit so that said register is loaded for communicating with said predetermined one of said management units only when an entire sample has been received.

9. The test system according to claim 7, wherein said exchange comprises means for sending signalling tones for outgoing multiplex links from a predetermined stage of said switching network by a digital generator, wherein the improvement further comprises, in said selection control means, receiving means for retrieving samples from an output of said generator having an output connected to an input of said storage register.

* * * * *